(12) United States Patent
Jarzra et al.

(10) Patent No.: US 8,638,760 B2
(45) Date of Patent: Jan. 28, 2014

(54) SYSTEM AND METHOD FOR DYNAMICALLY ESTABLISHING AND MANAGING CONNECTIONS

(75) Inventors: Cherif Jarzra, Sunnyvale, CA (US); Wen Zhao, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 632 days.

(21) Appl. No.: 12/620,214

(22) Filed: Nov. 17, 2009

(65) Prior Publication Data
US 2011/0116479 A1    May 19, 2011

(51) Int. Cl.
*H04Q 7/00* (2006.01)

(52) U.S. Cl.
USPC .......................................................... 370/332

(58) Field of Classification Search
None
See application file for complete search history.

(56) References Cited

U.S. PATENT DOCUMENTS

| | | | | |
|---|---|---|---|---|
| 5,574,969 A * | 11/1996 | Olds et al. | ...................... | 455/429 |
| 5,898,668 A * | 4/1999 | Shaffer | .......................... | 370/230 |
| 6,246,870 B1 * | 6/2001 | Dent et al. | ..................... | 455/405 |
| 6,430,161 B2 * | 8/2002 | Uemura et al. | ............... | 370/252 |
| 6,631,128 B1 * | 10/2003 | Lemieux | ....................... | 370/351 |
| 6,791,970 B1 * | 9/2004 | Ng et al. | ....................... | 370/352 |
| 6,965,948 B1 * | 11/2005 | Eneborg et al. | ............... | 709/250 |
| 7,075,932 B2 * | 7/2006 | Matsuhira et al. | ........ | 370/395.31 |
| 7,178,157 B1 * | 2/2007 | Kimura et al. | ................... | 725/38 |
| 7,512,087 B2 * | 3/2009 | Yoshikawa et al. | ........... | 370/328 |
| 7,526,310 B2 * | 4/2009 | Billmaier et al. | .......... | 455/550.1 |
| 7,649,881 B2 * | 1/2010 | Casey | .......................... | 370/389 |
| 8,014,364 B2 * | 9/2011 | Schindler et al. | ............. | 370/336 |
| 2002/0065076 A1 * | 5/2002 | Monroe | ........................ | 455/426 |
| 2004/0204133 A1 * | 10/2004 | Andrew et al. | ............... | 455/566 |
| 2005/0111360 A1 * | 5/2005 | Jin et al. | ........................ | 370/229 |
| 2006/0039365 A1 * | 2/2006 | Ravikumar et al. | ........... | 370/352 |
| 2006/0111058 A1 * | 5/2006 | Grant et al. | ................. | 455/127.1 |
| 2007/0183440 A1 * | 8/2007 | Bennet et al. | .................. | 370/419 |
| 2008/0075071 A1 * | 3/2008 | Beshai | .......................... | 370/386 |
| 2008/0167041 A1 * | 7/2008 | Wang et al. | ..................... | 455/436 |
| 2008/0287141 A1 * | 11/2008 | Vogel et al. | ................. | 455/456.3 |
| 2008/0311885 A1 * | 12/2008 | Dawson et al. | ................ | 455/406 |
| 2009/0031415 A1 * | 1/2009 | Aldridge et al. | ................. | 726/15 |
| 2009/0061852 A1 * | 3/2009 | Feher | ......................... | 455/426.1 |
| 2009/0238175 A1 * | 9/2009 | Joseph et al. | .................. | 370/352 |
| 2009/0274115 A1 * | 11/2009 | Schindler et al. | ............. | 370/331 |
| 2010/0097956 A1 * | 4/2010 | Tauil et al. | ..................... | 370/254 |
| 2010/0241748 A1 * | 9/2010 | Ansari et al. | ................... | 709/225 |
| 2011/0083174 A1 * | 4/2011 | Aldridge et al. | ................ | 726/12 |
| 2011/0269476 A1 * | 11/2011 | Kumar | ........................ | 455/456.1 |
| 2011/0286431 A1 * | 11/2011 | Schindler et al. | ............. | 370/331 |

* cited by examiner

*Primary Examiner* — Hassan Phillips
*Assistant Examiner* — Prenell Jones

(57) ABSTRACT

Techniques to dynamically manage wireless connections are described. For example, a mobile computing device may comprise a connection management module to dynamically select one of a plurality of switching technologies to initiate a connection with one or more target devices and automatically initiate the connection with the one or more target devices using the dynamically selected switching technology. Other embodiments are described and claimed.

15 Claims, 4 Drawing Sheets

SYSTEM AND METHOD FOR DYNAMICALLY ESTABLISHING AND MANAGING CONNECTIONS

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth. In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Providing such an array of functionality in a single device provides users with a variety of options in selecting appropriate wireless communications technologies to perform wireless communications tasks. When communicating, it is advantageous to select a wireless communications technology based on device, network or other conditions to improve performance and user experience. As a result, it is desirable to enhance the automatic and/or dynamic selection of wireless communications technologies. For example, it may be advantageous to automatically and/or dynamically select a wireless switching technology to manage a wireless connection. Consequently, there exists a substantial need for techniques to improve the selection and management of wireless connections.

DETAILED DESCRIPTION

Figure 1:
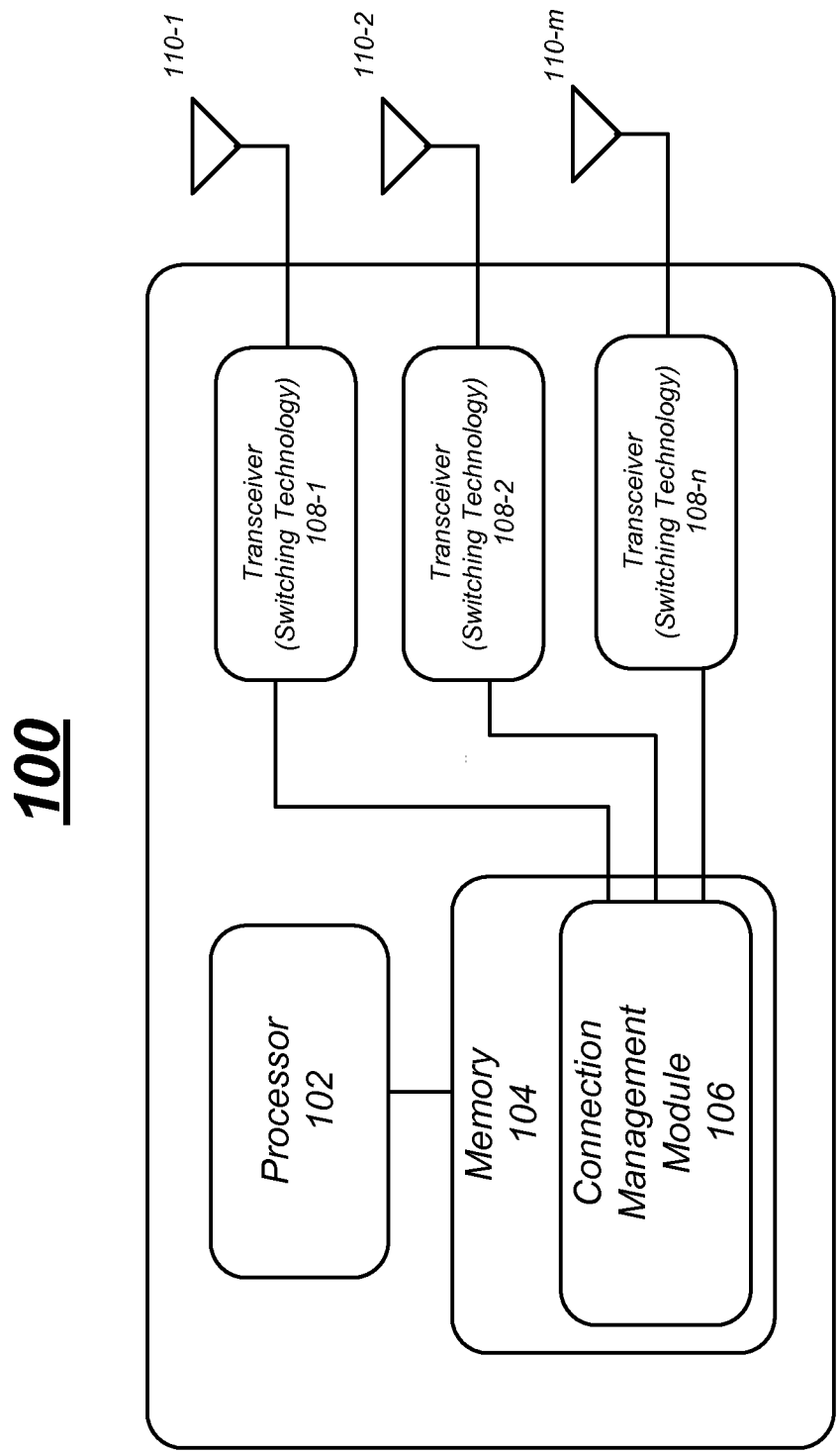
FIG. 1 illustrates one embodiment of a first mobile computing device.

Various embodiments may be generally directed to connection management techniques for a mobile computing device, such as a smart phone. Some embodiments may be particularly directed to dynamic connection management techniques for a mobile computing device based on system, network or other parameters.

In one embodiment, for example, a mobile computing device may include a connection management module. In various embodiments, the connection management module may use one or more system or network parameters to dynamically select one of a plurality of available switching technologies to initiate a connection with one or more target devices, and automatically initiate the connection. Examples of the one or more system or network parameters may include network availability, signal quality, system power, system load, system memory, connection speed, type of connection, time of connection, cost of connection, quality of service or location, for example.

Dynamically selecting one of a plurality of switching technologies for initiating a connection may provide several advantages. For example, by enabling the dynamic selection feature, a user may enjoy the benefit of continually establishing connections based on cost, quality, location, time, system resources or any number of other factors at any time without unnecessarily interacting with the mobile computing device or specifically selecting a switching technology each time a connection is desired. If a user wishes to place a telephone call, for example, it may be advantageous for the mobile computing device to automatically and/or dynamically determine which available switching technology would be most efficient and/or cost effective given the current location of the mobile computing device. For example, if the mobile computing device is in a location where a Wireless Fidelity (WiFi) connection is available, it may be advantageous to use the WiFi switching technology to establish the call to conserve the user's wireless minutes associated with their calling plan. If the above-described user were to change locations, for example, it may be advantageous for the mobile computing device to automatically switch to a cellular circuit switching connection if the WiFi connection is no longer available. Limiting user interaction in the dynamic selection, monitoring and updating of wireless connections may improve user experience and system and network performance. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of an apparatus. In particular, FIG. 1 shows a first embodiment of a mobile computing device 100. The mobile computing device 100 may include by way of example and not limitation a processor 102, a memory 104, a connection management module 106, transceivers/switching technologies 108-1-*n* and antennas 110-1-*m*. These elements or portions of these elements may be implemented in hardware, software, firmware, or in any combination thereof. The embodiments are not limited to these depicted elements.

The mobile computing device 100 may be generally configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Pre™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

The mobile computing device may include a processor 102 coupled to the connection management module 106 in some embodiments. The processor 102 may be operative to execute the connection management module 106. The mobile computing device 100 may further include a memory 104 coupled to the processor 102. The memory 104 may be operative to store the connection management module 106. Other embodiments are described and claimed.

The processor 102 may comprise a general purpose processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 104 may comprise computer-readable media such as volatile or non-volatile memory units arranged to store programs and data for execution by the processor 102. As depicted in FIG. 1, the memory 104 may store a connection management module 106 in the form of executable program instructions, code or data. The processor 102 may retrieve and execute the program instructions, code or data from the memory 104 to control or provide dynamic connection management operations for the mobile computing device 100. Although the connection management module 106 is shown as part of the memory 104 for execution by the processor 102, it may be appreciated that connection management module 106 may be stored and executed by other memory and processing resources available to the mobile computing device 100. Further, although connection management module 106 is depicted as software executed by a processor, it may be appreciated that the operations for connection management module 106 may be implemented in hardware as well using one or more integrated circuits, for example. The embodiments are not limited in this context.

The mobile computing device 100 may include one or more modules, such as transceiver (switching technology) modules 108-1-$n$ and/or antennas 110-1-$m$, arranged to communicate information over one or more types of wireless communication links. Examples of a wireless communication link may include, without limitation, a radio channel, infrared channel, radio-frequency (RF) channel, WiFi channel, a portion of the RF spectrum, and/or one or more licensed or license-free frequency bands. In the latter case, the wireless nodes may include one more wireless interfaces and/or components for wireless communication, such as one or more transmitters, receivers, transmitter/receivers ("transceivers") 108-1-$n$, radios, chipsets, amplifiers, filters, control logic, network interface cards (NICs), antennas 110-1-$m$, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques. Other embodiments are described and claimed.

In various embodiments, connection management module 106 may be configured to dynamically select one of the plurality of switching technologies 108-1-$n$ to initiate a connection with one or more target devices. For example, mobile computing device 100 may have the capability of establishing different types of wireless connections for different purposes. In some embodiments, a connection for establishing a telephone call with a target device using one or more of cellular circuit switching, Voice over Internet Protocol (VoIP) switching over WiFi, or VoIP switching over cellular may be possible. While a limited number of switching technologies for a limited use are described herein for purposes of illustration, it should be understood that any suitable switching technology, wireless communication technology or standard could be used to establish and type of wireless connection and still fall within the described embodiments.

In some embodiments, the dynamic selection of a switching technology by the connection management module 106 may be based on one or more system, network or other parameters. For example, connection management module 106 may be configured to monitor parameters associated with mobile computing device 100 and select a switching technology based on the monitored parameters. Connection management module 106 may also be configured to monitor parameters associated with available wireless networks. In some embodiments, the system or network parameters comprise one or more of network availability, signal quality, system power, system load, system memory, connection speed, type of call, time of call, cost of call, quality of service, or location. Other embodiments are described and claimed.

Connection management module 106 may be configured to monitor available connections and dynamically select a switching technology 108-1-$n$ based on availability in some embodiments. For example, while mobile computing device 100 may be capable of communicating using a plurality of switching technologies 108-1-$n$, a subset of the switching technologies (e.g. 108-1 and 180-2, for example) may be available at any given time due to any number of factors. In various embodiments, connection management module 106 may be configured to dynamically select a switching technology 108-1-$n$ from the available subset of switching technologies.

In some embodiments, connection management module 106 may be configured to monitor signal quality associated with each available switching technology 108-1-$n$ and dynamically select the switching technology 108-1-$n$ with the highest signal quality, for example. Selections based on signal quality may also be based on the type of connection that is desired, the duration of the connection, a signal loss threshold for the connection or any other suitable factor. Other embodiments are described and claimed.

In various embodiments, connection management module 106 may be configured to monitor system power for mobile computing device 100 and dynamically select a switching technology 108-1-$n$ based on the system power. For example, connection management module 106 may determine that establishing a connection using a particular switching technology will result greater power consumption than another switching technology, which may be undesirable.

System load for the mobile computing device 100 may be monitored and connection management module 106 may be configured to dynamically select a switching technology 108-1-$n$ based on the system load in various embodiments. For example, connection management module 106 may be configured select a switching technology 108-1-*n* in view of other applications or processes that are being executed by mobile computing device 100, based on system processing capacity, or based on a system load or processing threshold. Similarly, connection management module 106 may be configured to monitor available system memory and may dynamically select a switching technology 108-1-*n* based on memory consumption or a configurable memory consumption threshold.

Connection speed may be monitored by connection management module 106 in some embodiments and the switching technology 108-1-*n* having a desired connection speed may be dynamically selected. For example, for a connection requiring a large amount of data to be transmitted, such as a streaming data connection, connection management module 106 may dynamically select a switching technology 108-1-*n* having a high connection speed. In various embodiments, the type of connection that is desired may also be considered by connection management module 106 when dynamically selecting a switching technology 108-1-*n*. For example, if the connection is for establishing a telephone call, a switching technology having a high quality of service and low loss rate may be selected. In some embodiments, the location of the mobile computing device determined by global positioning system (GPS) technology, cellular triangulation technology, or other technology may be used to assist in the dynamic selection process. Other embodiments are described and claimed.

In various embodiments, other parameters may also be monitored and used to assist in the dynamic selection process. For example, connection management module 106 may be configured to use information regarding the user's cellular calling plan or data plan when dynamically selecting a switching technology 108-1-*n*. Calling and data plans often place limits on the number of minutes that can be consumed or the amount of data than can be transmitted/received during a billing cycle without incurring penalties or other charges. Many calling plans also implement restrictions based on the time of day. For example, calls after 9:00 pm may be free. Some calling plans offer free connections between users having plans from the same service provider. This and other information related to cost metrics may be evaluated by connection management module 106 during the dynamic selection process.

In some embodiments, it may be advantageous to obtain information about the connection with the target device prior to dynamically selecting and establishing the wireless connection. For example, connection management module 106 may be configured retrieve information regarding a target user device from the contact management application of mobile computing device 100, over the air through a temporarily established connection with the target device, or from any other source. Information about the type of connection and information about the target device may be incorporated into the dynamic selection process by connection management module 106. Other embodiments are described and claimed.

While a limited number of factors are described herein for purposes of illustration, it should be understood that any factor, information or parameter could be used to assist in the dynamic selection of a switching technology and still fall within the described embodiments.

In various embodiments, the connection management module 106 may be configured to execute an algorithm to generate an expected quality of service (QoS) or service matrix for each switching technology 108-1-*n* and select a switching technology 108-1-*n* based on the expected QoS or switching matrix. For example, the algorithm may include any of the above or any other factors relevant to establishing a wireless connection using one of a plurality of available switching technologies 108-1-*n*. In some embodiments, the expected QoS and/or service matrix may be based on one or more cost metrics or performance metrics for each available switching technology 108-1-*n*. Other embodiments are described and claimed.

In various embodiments, the connection management module 106 may be configured to automatically initiate the connection with the one or more target devices using the dynamically selected switching technology. For example, a user may enable the dynamic selection using the connection management module 106 as a system preference or application, and may optionally enter preferences regarding switching technologies and connections during a setup process. After being enabled, the dynamic selection and automatic connection process may continue with limited or no user interaction until the feature is disabled or otherwise disconnected.

In some embodiments, dynamic selection and automatic connection initiation by the connection management module 106 may be a default feature that is implemented when a device is activated and may optionally be deactivated by a user. Making the dynamic selection and automatic connection a default operation may result in a user never needing to change any preferences regarding wireless connections in some embodiments.

The connection management preference/application may comprise one or more visible user interfaces for ease of use in some embodiments. For example, the application may comprise a simple interface allowing a user to enable or disable the dynamic connection selection feature, and to select preferences for establishing connections. Preferences may include, for example, ranking of items by importance to the user, such as cost, quality, processing impact or any other factor. In some embodiments, an underlying or hidden layer may be configured for decision making. For example, the algorithm described above may comprise the underlying layer.

In various embodiments, the connection management module may be configured to monitor the selected switching technology and one or more non-selected switching technologies after a connection has been established with one or more target devices. For example, mobile computing device 100 may establish a connection with a target device using a dynamically selected switching technology and the connection management module 106 may, thereafter, continue to monitor to the established connection as well as other available connections. In some embodiments, the connection management module 106 may be configured to automatically perform a handoff to one of the one or more non-selected switching technologies based on changes in system, network, or other parameters. For example, if the connection management module 106 determines that a non-selected switching technology is now more advantageous than the currently implemented switching technology, a handoff may occur. The handoff may be transparent to the user in some embodiments in that the handoff occurs in the background without dropping an existing call or data connection, for example.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 2:
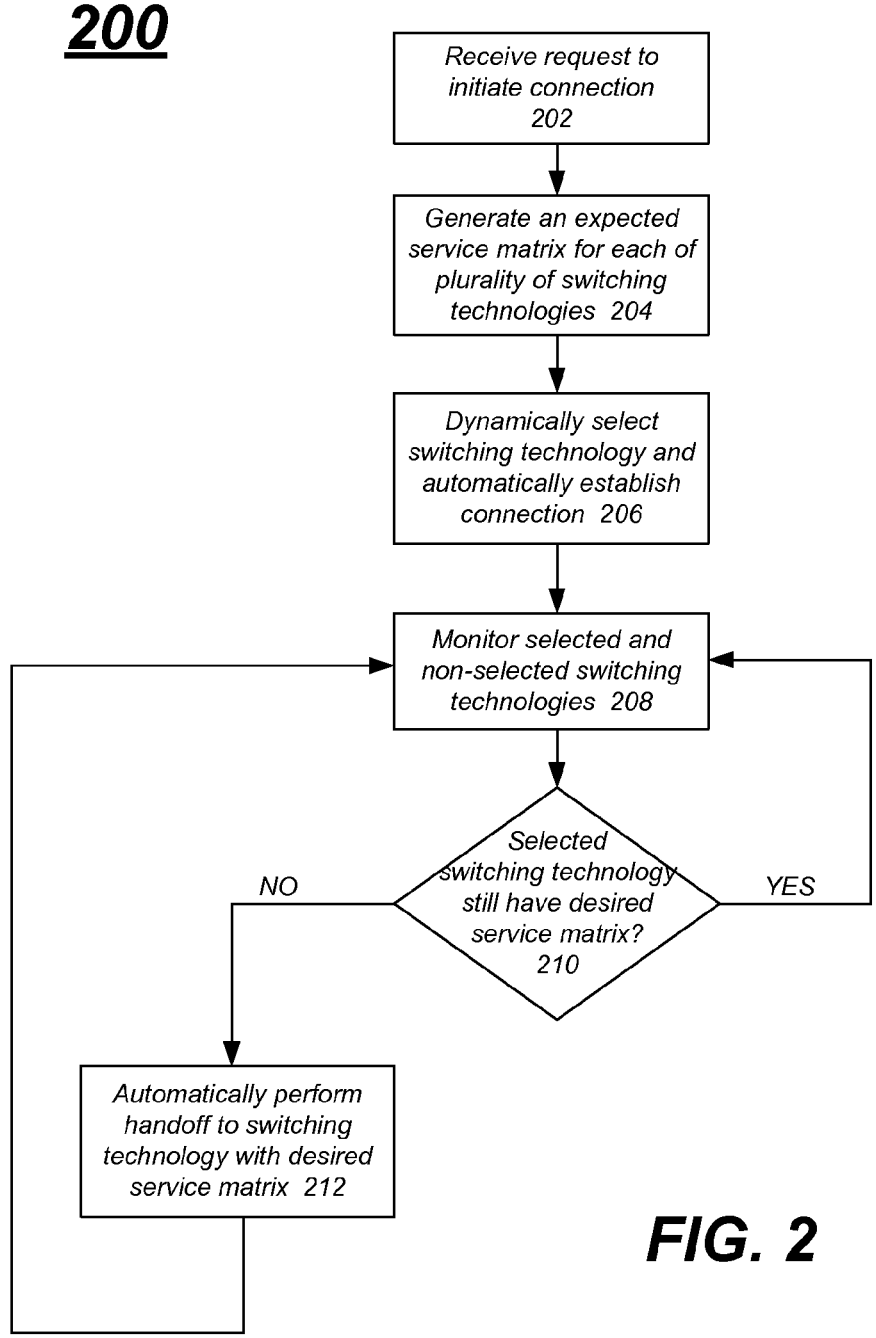
FIG. 2 illustrates one embodiment of a first logic diagram.

FIG. 2 illustrates a first embodiment of a logic diagram. In particular, FIG. 2 illustrates a logic diagram 200, which may be representative of the operations executed by one or more embodiments described herein. FIG. 2 illustrates an embodiment of a connection and handoff process for mobile computing device 100 including a connection management module 106, for example.

In various embodiments, a request to initiate a connection may be received at 202. For example, a user may initiate a wireless telephone call using mobile computing device 100 in an effort to establish a wireless telephone connection with a user of a target device. At 204, an expected service matrix and/or QoS for each of a plurality of available switching technologies may be generated in some embodiments. For example, connection management module 106 may execute an algorithm that includes cost and performance metrics related to each potential available wireless switching technology.

In various embodiments, one of the plurality of available switching technologies may be dynamically selected to establish a connection with the target device or devices at 206. For example, connection management module may rank the available switching technologies based on the expected service matrix and/or QoS of each switching technology, and may dynamically select a switching technology based on the ranking and/or QoS and may automatically initiate a connection with the target device using the dynamically selected switching technology. Other embodiments are described and claimed.

At 208, connection management module 106 may continue to monitor the dynamically selected switching technology and the non-selected switching technologies. For example, connection management module may continuously or periodically generate an expected service matrix and/or QoS for both the switching technology that is in use and any available switching technologies that are not in use. In some embodiments, a determination is made at 210 as to whether or not the selected switching technology continues to operate at a desired service matrix and/or QoS. For example, changes in location, system or network conditions may result in changes to the service matrix and/or QoS which may result in the dynamically selected switching technology no longer being the most appropriate switching technology for the wireless connection.

In various embodiments, a handoff to a switching technology having a desired service matrix and/or QoS is automatically performed at 212 if the previously selected switching technology is no longer operating at a desired service matrix and/or QoS. For example, a cellular circuit switching technology may have been initially dynamically selected by connection management module 106. However, based on system, network or other changes, connection management module 106 may initiate a handoff to a VoIP switching technology over WiFi, for example. In some embodiments, the dynamically selected switching technology may continue to maintain a desired service matrix and/or QoS at 210 and monitoring of the selected and non-selected switching technologies may continue at 208. Other embodiments are described and claimed.

Figure 3:
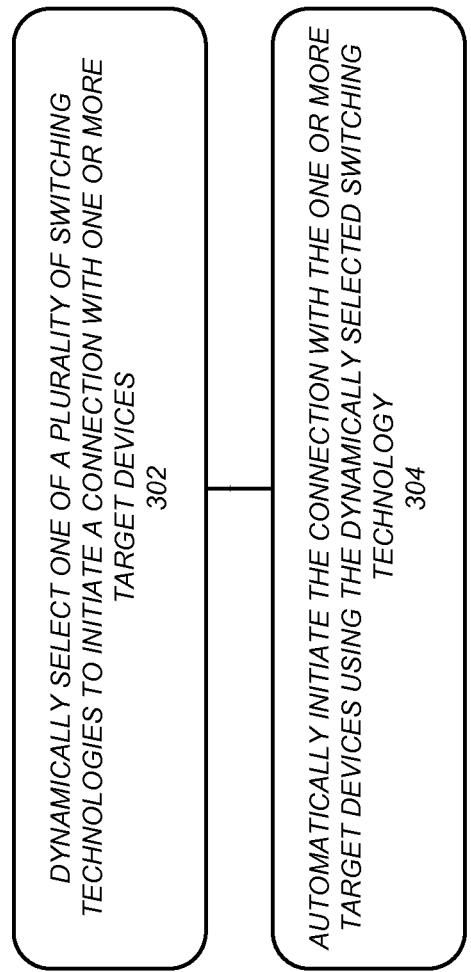
FIG. 3 illustrates one embodiment of second logic diagram.

FIG. 3 illustrates a second embodiment of a logic diagram. In particular, FIG. 3 illustrates a logic diagram 300, which may be representative of the operations executed by one or more embodiments described herein. As shown in the FIG. 3, one of a plurality of switching technologies may be dynamically selected to initiate a connection with one or more target devices at 302. For example, connection management module 106 may be configured to dynamically select one of a plurality of switching technologies available for mobile computing device 100. In some embodiments, the connection with the one or more target devices may be automatically initiated using the dynamically selected switching technology at 304. For example, after dynamically selecting a switching technology, connection management module 106 may automatically initiate the connection with the target device with limited or no further user interaction such as manual selection or confirmation of the selected switching technology.

In various embodiments, the dynamic selection may be based on one or more system or network parameters wherein the system or network parameters comprise one or more of network availability, signal quality, system power, system load, system memory, connection speed, type of call, time of call, cost of call, quality of service, or location. Any type or number of system, network or other parameters that would affect the wireless connection could be used and fall within the described embodiments.

An expected service matrix for each available switching technology may be generated and the switching technology may be dynamically selected based on the expected service matrix in some embodiments. In various embodiments, the expected service matrix may based on one or more cost metrics or performance metrics for each available switching technology. For example, connection management module 106 may include the cost of establishing a connection using each switching technology in an algorithm used to generated the expected service matrix and select a switching technology.

In some embodiments, the selected switching technology and one or more non-selected switching technologies may be monitored after a connection has been established with one or more target devices and a handoff to one of the one or more non-selected switching technologies may be performed automatically based on changes in system or network parameters. The handoff procedure is described above in more detail with reference to the logic diagram of FIG. 2. Other embodiments are described and claimed.

Figure 4:
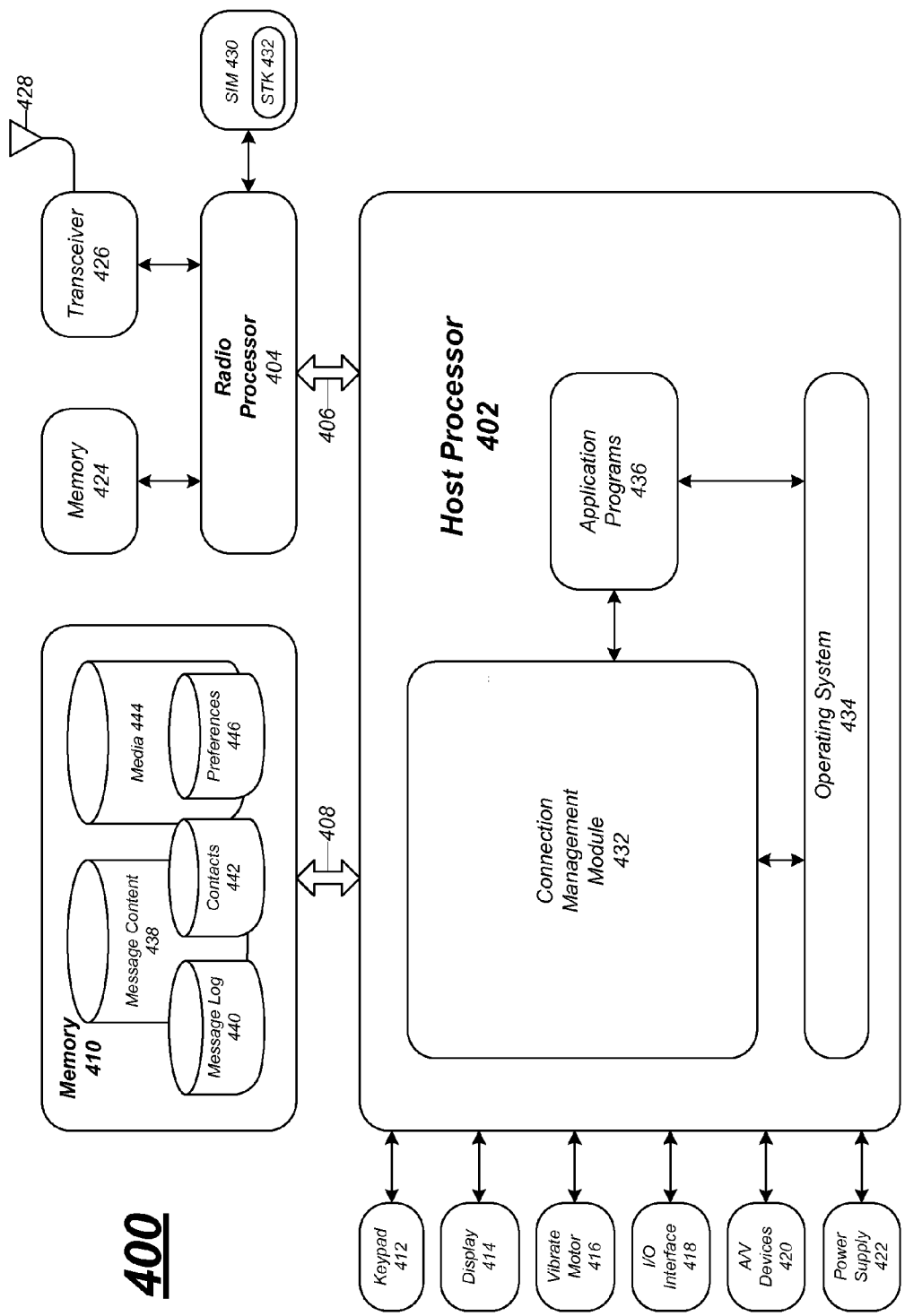
FIG. 4 illustrates one embodiment of a second mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth, similar to transceivers/switching technologies 108-1-n of FIG. 1. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals, similar to antennas 110-1-m of FIG. 1. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include a connection management module 432. The connection management module 432 may the same or similar to the connection management module 106 described with reference to FIG. 1.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
a processor to:
generate an expected service matrix for each of a plurality of switching technologies to initiate a connection with one or more target devices, wherein the expected service matrix for a respective switching technology is based on one or more metrics for the respective switching technology;
dynamically select one of the plurality of switching technologies to initiate a connection with the one or more target devices based on a ranking of the switching technologies using the expected service matrices;
automatically initiate the connection with the one or more target devices using the dynamically selected switching technology;
monitor the selected switching technology and one or more non-selected switching technologies after the connection has been initiated with the one or more target devices; and
automatically perform a handoff from the selected switching technology to one of the one or more non-selected switching technologies based on changes in system or network parameters, wherein the handoff is performed seamlessly without interrupting the connection to the one or more target devices.

2. The mobile computing device of claim 1, wherein the handoff is performed in response to determining that a specified service matrix for the one of the one or more non-selected switching is more desirably ranked than the selected switching technology based on the one or more metrics.

3. The mobile computing device of claim 1, wherein the dynamic selection is based on the one or more system or network parameters.

4. The mobile computing device of claim 3, wherein the system or network parameters comprise one or more of network availability, signal quality, system power, system load, system memory, connection speed, type of call, time of call, cost of call, quality of service, or location.

5. The mobile computing device of claim 1, wherein the one or more switching technologies comprise one or more of cellular circuit switching, Voice over Internet Protocol (VoIP) switching over WiFi, or VoIP switching over cellular.

6. A method for execution by a mobile computing device, comprising:
generating, by the mobile computing device, an expected service matrix for each of a plurality of switching technologies to initiate a connection with one or more target devices, wherein the expected service matrix for a respective switching technology is based on one or more metrics for the respective switching technology;
dynamically selecting one of the plurality of switching technologies to initiate a connection with the one or more target devices based on a ranking of the switching technologies using the expected service matrices;
automatically initiating the connection with the one or more target devices using the dynamically selected switching technology;
monitoring the selected switching technology and one or more non-selected switching technologies after the connection has been initiated with the one or more target devices; and
automatically perform a handoff from the selected switching technology to one of the one or more non-selected switching technologies based on changes in system or network parameters, wherein the handoff is performed seamlessly without interrupting the connection to the one or more target devices.

7. The method of claim 6, wherein the handoff is performed in response to determining that a specified service matrix for the one of the one or more non-selected switching is more desirably ranked than the selected switching technology based on the one or more metrics.

8. The method of claim 6, wherein the dynamic selection is based on the one or more system or network parameters.

9. The method of claim 8, wherein the system or network parameters comprise one or more of network availability, signal quality, system power, system load, system memory, connection speed, type of call, time of call, cost of call, quality of service, or location.

10. The method of claim 6, wherein the one or more switching technologies comprise one or more of cellular circuit switching, Voice of Internet Protocol (VoIP) switching over WiFi, or VoIP switching over cellular.

11. A non-transitory computer-readable medium storing instructions that, when executed by one or more processors, cause the one or more processors to:
generate an expected service matrix for each of a plurality of switching technologies to initiate a connection with one or more target devices, wherein the expected service matrix for a respective switching technology is based on one or more metrics for the respective switching technology;
dynamically select one of the plurality of switching technologies to initiate a connection with the one or more target devices based on a ranking of the switching technologies using the expected service matrices; and
automatically initiate the connection with the one or more target devices using the dynamically selected switching technology;
monitor the selected switching technology and one or more non-selected switching technologies after the connection has been initiated with the one or more target devices;
automatically perform a handoff from the selected switching technology to one of the one or more non-selected switching technologies based on changes in system or network parameters, wherein the handoff is performed seamlessly without interrupting the connection to the one or more target devices.

12. The non-transitory computer-readable medium of claim 11, wherein the handoff is performed in response to determining that a specified service matrix for the one of the one or more non-selected switching is more desirably ranked than the selected switching technology based on the one or more metrics.

13. The non-transitory computer-readable medium of claim 11, wherein the dynamic selection is based on the one or more system or network parameters.

14. The non-transitory computer-readable medium of claim 13, wherein the system or network parameters comprise one or more of network availability, signal quality, system power, system load, system memory, connection speed, type of call, cost of call, quality of service or location.

15. The non-transitory computer-readable medium of claim 11, wherein the one or more switching technologies comprise one or more of cellular circuit switching, Voice over Internet Protocol (VoIP) switching over WiFi, or VoIP switching over cellular.

* * * * *